Oct. 28, 1969

F. F. SAMUEL 3,475,615

PROCESS AND APPARATUS FOR THE DETECTION
OF FLAWS IN A TRANSPARENT MATERIAL

Filed Nov. 29, 1967

INVENTOR
FRANÇOIS F. SAMUEL
BY
Mason, Fenwick & Lawrence
ATTORNEYS

Oct. 28, 1969  F. F. SAMUEL  3,475,615
PROCESS AND APPARATUS FOR THE DETECTION
OF FLAWS IN A TRANSPARENT MATERIAL
Filed Nov. 29, 1967  3 Sheets-Sheet 2

INVENTOR
FRANCOIS F. SAMUEL
BY
Mason, Fenwick & Lawrence
ATTORNEYS

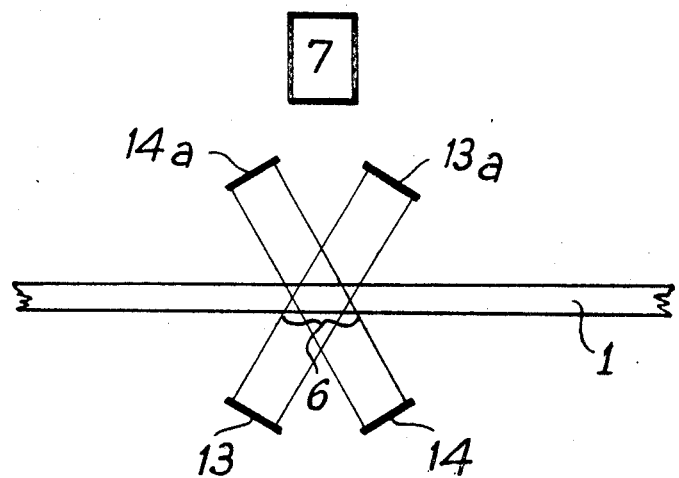

United States Patent Office 3,475,615
Patented Oct. 28, 1969

3,475,615
PROCESS AND APPARATUS FOR THE DETECTION OF FLAWS IN A TRANSPARENT MATERIAL
François F. Samuel, Bougival, France, assignor to Société Generale d'Optique, Paris, France, a society of France
Filed Nov. 29, 1967, Ser. No. 686,538
Claims priority, application France, Nov. 29, 1966, 85,486
Int. Cl. H01j 39/12
U.S. Cl. 250—219         3 Claims

ABSTRACT OF THE DISCLOSURE

Process and apparatus for detecting flaws in a sheet of moving transparent material comprising a source of light and at least one photo-sensitive detector. At least two reflecting surfaces one positioned on either side of the sheet of moving material. One of the reflecting surfaces receiving a beam of light from the source and each of the surfaces capable of receiving and reflecting the rays of light reflected by the other. The plane of one of the reflecting surfaces being inclined relative to the axis of the emitted light beam and the light detector being directed towards the illuminated zone of the sheet of material but situated outside the beam of light.

---

The invention relates to a process and an apparatus for the automatic detection of defects in a transparent product, such as glass, plastic material etc., taking the form of a regular surface, such as a plane or cylindrical surface etc.

The inspection of transparent materials of this kind consists mainly of the detection of irregularities in the manufacturing process, resulting in any blowholes, blisters, hair-lines, occlusions of foreign matter or surface unevenness. When faults have been brought to light, they are identified by marking them, after which the defective area is cut off the product, an effort being made to keep the amount of wastage to a minimum.

It is of advantage to carry out this inspection automatically, which enables the positions of the faults to be stored in a memory or identified in some other manner.

In a transparent substance a flaw generally manifests itself in the form of an anomaly in the propagation of light through the said substance, particularly a dispersion of the beam.

It has already been suggested that a beam of light, terminating in a photo-sensitive cell, be passed through the material to be examined.

The presence of a fault is manifested in a modification of the propagation of the beam, so that it is received by the cell in an attenuated form, the cell therefore supplying a weaker electric signal. This reduction in intensity may be very slight, as the linear dimensions of a defect may be small by comparison with the field of observation of the cell. The extremely limited relative variation in the electric signal emitted by the cell is a source of numerous difficulties.

It is the elimination of this very drawback that forms the object of the invention, its purpose being to produce, in accordance with each particular defect, an electric signal of a considerably higher relative value than that obtained hitherto.

The purpose of the invention is thus to provide a process for the detection of flaws in a sheet of transparent material to which a traversing movement is imparted and which undergoes displacement in front of a source of light and at least one light detector, and the beam of light emitted by the source passes through the transparent material, the detector used in this process being situated outside the beam but its field of vision embracing the illuminated zone of the transparent material, the beam of light undergoing a series of successive reflections on either side of the sheet of transparent material, whereby the beam is progressively displaced in a direction substantially perpendicular to the direction of motion of the sheet.

The invention also relates to a detection apparatus enabling the aforementioned process to be applied. This apparatus consists essentially of at least two reflecting surfaces, situated on both sides of the sheet of material, and preferably transversal in respect of the latter, each of them being capable of receiving the light rays reflected by the other. The plane of one of these reflecting surfaces is inclined with respect to the axis of the beam emitted by the source, while the light detector is directed toward the illuminated zone of the sheet of material but situated outside the said beam of light.

The invention will be understood more completely by reference to the following description, which is provided solely by way of an example and in the course of which the secondary characteristics of the invention and the advantages offered by it will become apparent. Reference will be made to the accompanying drawings, in which:

FIG. 1b is a side view of the apparatus shown in FIG. 1a;

FIG. 1c is a front view of an end of the sheet of material inspected, in the case of the apparatus shown in FIG. 1a;

FIG. 2 is a schematic side view of an alternative embodiment of the invention.

Figure 1A:
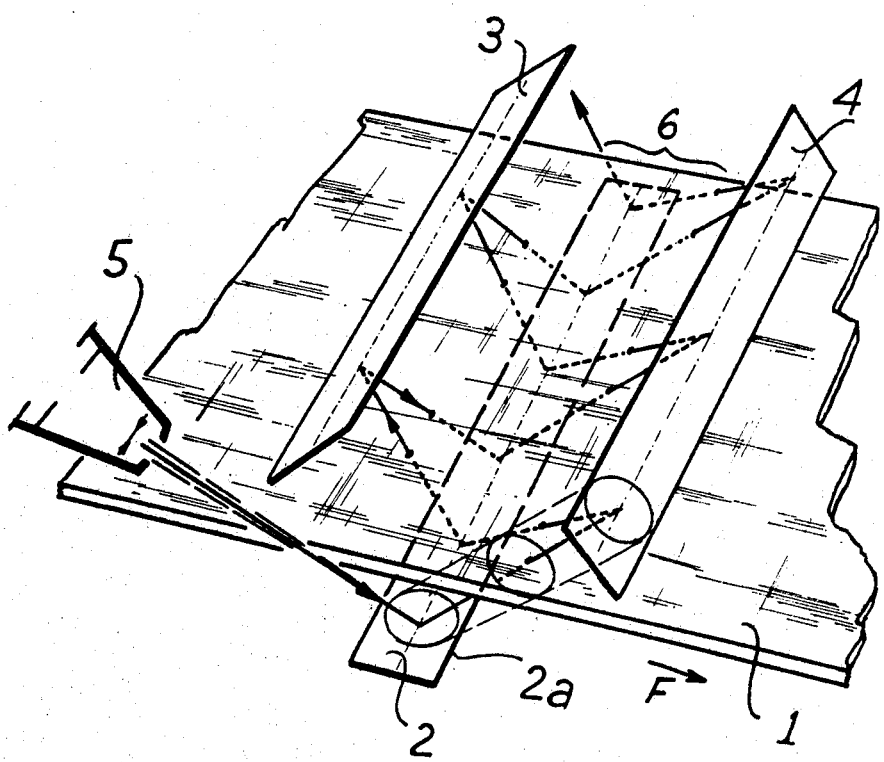
FIG. 1a is a schematic diagram, in perspective, of a first version of an apparatus in accordance with the invention.
Figure 1B:
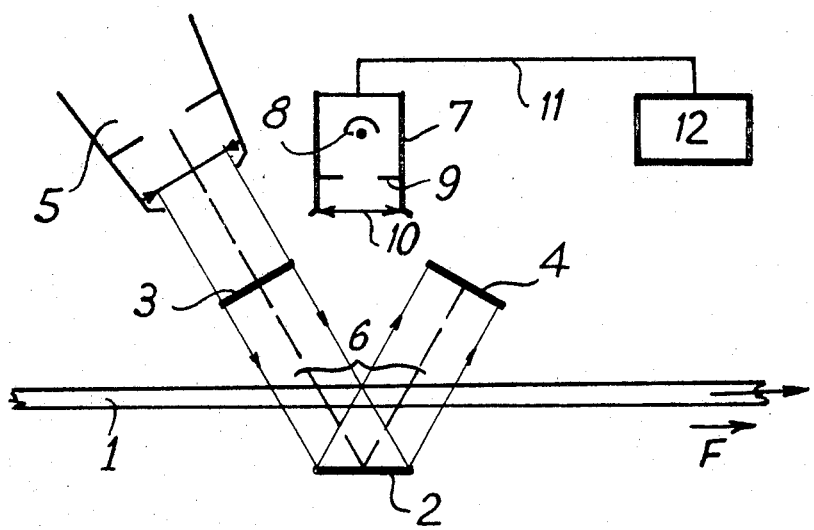
Figure 1C:
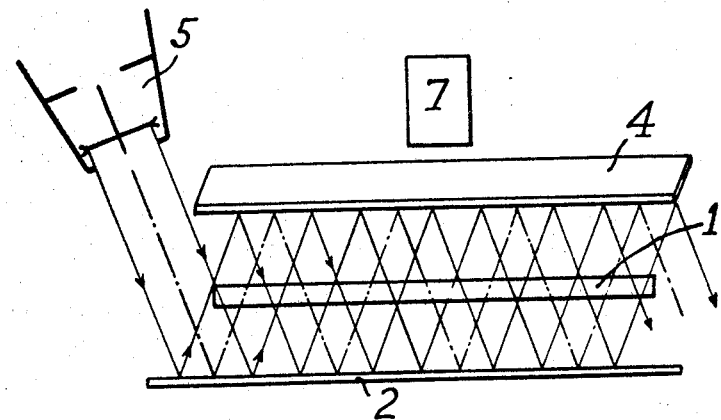

Referring to FIGS. 1a, 1b and 1c, a sheet of material 1 may be seen, this consisting in the present case of a sheet of flat glass, in which the flaws are to be detected and located. These flaws are, in fact, defects of all types, emanating from heterogeneity in the interior of the substance or on the surface of the sheet of material 1.

In general, it is more convenient, although not stipulated in the invention, if the sheet 1 to be inspected is moved longitudinally, as indicated by the arrow F. As an alternative method, the sheet 1 could be kept motionless and the detection apparatus moved past it.

In the constructional version illustrated in FIGS. 1a, 1b and 1c, the detection apparatus comprises three plane mirrors 2, 3 and 4. The mirror 2, is situated underneath the sheet 1, the other two mirrors 3 and 4 are mounted above sheet 1, in a transverse direction in relation to the direction of movement F.

The three mirrors 2, 3 and 4 are positioned obliquely with respect to one another, as will be understood more clearly in due course.

One end 2a of the mirror 2 extends beyond one side of the sheet 1. A source of light consisting of a projector 5 conveys a beam of light onto the extended end of the mirror 2. This beam is reflected through the sheet 1 onto the mirror 4, again onto the mirror 2, then onto the mirror 3, through the sheet 1, again onto the mirror 2 etc., as may be clearly seen from the diagrams in question.

The beam is to some extent confined in an enclosure delimited by the mirrors 2, 3 and 4. In the course of its succesive reflections it is progressively moved towards the other end of the sheet 1'. The latter is thus illuminated uninterruptedly throughout its mass in a continuous transversal zone 6.

To render the drawing clearer, the light detector 7, which forms part of the detection apparatus covered by the invention, has not been shown in FIG. 1a.

This detector 7, of a known type, comprises a photoelectric cell 8 and a diaphragm 9, associated with a lens 10. These last two items confine the field of vision of the cell 8 to the zone 6 which is illuminated, or even to one particular strip of this zone.

Needless to say, the single detector 7 can be replaced by a set of detectors situated side by side, each one of the latter being applied to one particular fraction of the zone 6.

The cell or cells 8 are electrically connected by a line 11 to an indicator or recorder 12, in accordance with the known system.

The detector 7 is situated in such a manner that the zone 6 comes within its field of vision; it is nevertheless situated outside the direct or reflected beam of light. In this particular constructional version of the invention the detector 7 can be placed above the sheet 1, since the beam is confined between the mirrors 2, 3 and 4.

If the sheet 1 is free of defects, the tragectory followed by the beam through the material is that determined by the position of the mirrors 2, 3 and 4. Under these circumstances, the cell 8 receives no light; it receives no other signal than that corresponding to its internal background noise or to the ambient lighting. The latter, moreover, may be reduced, by means of screens or light traps, already known in themselves.

When the material contains a flaw, it causes a dispersion of the rays of light that make impact on it, this dispersion being largely equal in all directions. Consequently, some of the rays thus dispersed will escape the enclosure delimited by the mirrors 2, 3 and 4 and will reach the cell 8. The latter supplies an electrical impulse bearing a high ratio to the preceding background noise.

FIG. 2 shows an alternative version of the apparatus covered by the invention, with the use of four mirrors in pairs, 13 and 13a, 14 and 14a. Each pair, 13 and 13a, 14 and 14a, consists of two mirrors parallel to each other but preferably inclined in relation to the plane of the sheet 1. In each pair, 13–13a, the beam of light is successively conveyed from one mirror to another, through the material 1. The illuminated zone 6 will preferably be one and the same zone for the two pairs of mirrors. As in the previous case, the two beams progress transversally to the sheet of material 1, and the detector 7 is situated above the zone 6. It will be noted that one single pair of mirrors could prove suitable.

One of the important advantages offered by the invention resides in the fact that the field of the detector or detectors may be considerably larger than the size of the flaws without thereby detracting from the quality of the detecting operation. The transmission band of any electronic circuits which may be associated with the apparatus covered by the invention can be comparatively limited, the size of the field of the detector being adjusted in accordance with the degree of resolution required and not with the size of the defects.

What is claimed is:
1. Flaw detecting means for detecting flaws in a sheet of moving transparent material comprising at least two elongated reflecting surfaces which are respectively fixedly positioned on opposite sides of the moving sheet of transparent material and extend transversely with respect to the direction of movement of the sheet of transparent material, a light beam source means for projecting a light beam onto one of said reflecting surfaces for subsequent successive reflections along a light path through a zone of the moving sheet of transparent material onto the other reflecting surface and light detector means positioned outside said light path for detecting reflections from said zone caused by flaws in said transparent material moving through said zone.

2. The invention of claim 1 wherein three reflecting surfaces are employed with two of said reflecting surfaces being on one side of said sheet of moving transparent material and the other reflecting surface being on the opposite side of said sheet.

3. The invention of claim 1 wherein four reflecting surfaces are arranged in two pairs with each pair comprising two parallel reflecting surfaces respectively positioned on opposite sides of the sheet of transparent material and the light beam source means projects two beams of light respectively onto one of the reflecting surfaces of each pair for subsequent successive reflection through said zone to the other reflecting surface of each respective pair.

References Cited
UNITED STATES PATENTS

| | | |
|---|---|---|
| 3,302,786 | 2/1967 | Conrad. |
| 2,753,464 | 7/1956 | Stone. |
| 3,041,462 | 6/1962 | Ogle. |
| 3,227,037 | 1/1966 | Park et al. |
| 3,338,130 | 8/1967 | Gaffard. |
| 3,386,579 | 6/1968 | Schulze et al. |

RALPH G. NILSON, Primary Examiner

C. M. LEEDOM, Assistant Examiner

U.S. Cl. X.R.

356—200, 239; 250—200